United States Patent [19]

Kawaguchi et al.

[11] Patent Number: 4,519,270
[45] Date of Patent: May 28, 1985

[54] FOOT-OPERATED CONTROL DEVICE FOR PARKING BRAKE

[75] Inventors: Hiroshi Kawaguchi, Mishima; Shuho Nishina, Susono, both of Japan

[73] Assignee: Toyota Jidosha Kabushiki Kaisha, Toyota, Japan

[21] Appl. No.: 440,610

[22] Filed: Nov. 10, 1982

[30] Foreign Application Priority Data

Nov. 16, 1981 [JP] Japan .............................. 56-170444[U]
Nov. 18, 1981 [JP] Japan .............................. 56-171704[U]

[51] Int. Cl.³ ................................................ G05G 5/06
[52] U.S. Cl. ........................................ 74/535; 74/539
[58] Field of Search .............. 74/529, 534, 512, 539, 74/540, 542, 527, 526, 535; 267/155, 154

[56] References Cited

U.S. PATENT DOCUMENTS

| | | | |
|---|---|---|---|
| 2,141,266 | 12/1938 | Dickerson | 74/542 |
| 2,288,169 | 6/1942 | McCarthy | 74/537 |
| 2,754,692 | 2/1956 | Russell | 74/470 |
| 2,875,641 | 3/1959 | Powell | 74/539 |
| 2,915,916 | 12/1959 | Hinsey et al. | 74/542 |
| 3,051,015 | 8/1962 | Hinsey | 74/542 |
| 3,194,085 | 7/1965 | Kirk | 74/540 |
| 3,211,269 | 10/1965 | Emig | 74/577 |
| 4,036,078 | 7/1977 | Muehling | 74/529 |
| 4,138,905 | 2/1979 | Konishi | 74/535 |
| 4,385,529 | 5/1983 | Ejiri et al. | 74/539 |

FOREIGN PATENT DOCUMENTS

55-14636 4/1979 Japan .
2059022 4/1981 United Kingdom .

*Primary Examiner*—Kenneth J. Dorner
*Attorney, Agent, or Firm*—Kenyon & Kenyon

[57] ABSTRACT

A foot-operated device for controlling a parking brake wherein a parking brake pedal is locked in its operated position through engagement of a pawl member with ratchet teeth. The pawl member is pivotally connected to the brake pedal, and the ratchet teeth are formed on a sector or bracket fixed to a vehicle frame on which the brake pedal is pivotally supported. The parking brake is released when a pedal pad pivotally connected to the brake pedal is pivoted on the pedal and the pedal is depressed. The pedal pad is operatively connected by a lever to the pawl member which is normally held in engagement with the ratchet teeth by a first spring member. The lever is pivotally connected to the brake pedal, biased by the first spring member and engageable with the pawl member to transmit a biasing force of the first spring member to the pawl member so that the pawl member engages the ratchet teeth. The lever is pivoted by the pedal pad to remove the biasing force of the first spring member from the pawl member whereby the pawl member is set ready to disengage from the ratchet teeth by a second spring member whose biasing force is selected to be smaller than an engagement force between the pawl member and the ratchet teeth. The lever may be replaced by a rod which has a first end portion engaging the pawl member and a second end portion engaging the pedal pad. The rod which is biased by the first spring member normally keeps the pawl member in engagement with the ratchet teeth. The rod is linearly moved by the pedal pad to remove the biasing force of the first spring member from the pawl member thereby allowing the pawl member to disengage from the teeth.

15 Claims, 9 Drawing Figures

FOOT-OPERATED CONTROL DEVICE FOR PARKING BRAKE

BACKGROUND OF THE INVENTION

The present invention generally relates to a foot-operated control device for a parking brake of a vehicle, and more particularly to a control device which is manipulated solely by foot by the vehicle operator to release the parking brake being applied to the vehicle.

In the art of a foot-operated control device for a parking brake wherein a parking brake pedal is depressed by foot to apply the parking brake, the operation by the operator to release the applied parking brake has been conducted by hand. Such conventional control device suffers various problems such as: difficult manipulation for releasing the brake due to the operator's need for leaning forward while pulling a seat belt; generation of considerable sounds of impact of the brake pedal at the end of the quick return to its non-operated position upon releasing the brake; and difficult starting of a vehicle parked on a slope.

To overcome the above problems, there has been proposed a device as disclosed in JITSU-KAI-SHO 55-146363, publication of Japanese Utility Model application for public inspection, the disclosure of which is hereby incorporated by reference, wherein a parking brake is released by pivoting by foot a pedal pad pivotally connected to a parking brake pedal. To connect the pedal pad to a pawl member which is pivotally connected to the brake pedal and held in engagement with ratchet teeth by a first spring member, the disclosed device employs a linking mechanism which comprises an intermediate lever and a transmission rod which is connected at one end to the intermediate lever and at the other end to the pedal pad, so that a pivotal motion of the pedal pad in one direction by foot depression thereof is converted into a linear vertical motion of the transmission rod which in turn is changed into a pivotal motion of the intermediate lever which then causes a second spring member between the lever and the pawl member to be flexed, whereby the pawl member is biased by the second spring member in a direction opposite to the biasing direction of the first spring member, i.e., in the direction that causes the pawl member to disengage from the ratchet teeth. A pivotal movement of the brake pedal by applying a further depression onto the pedal pad in this condition will result in removal of an engagement force which has existed between the pawl member and the ratchet teeth, thereby permitting disengagement of the pawl member from the ratchet teeth.

However, the above foot-operated control device known in the art which uses the transmission rod and the intermediate lever, is not satisfactory in view of its complicated linking mechanism and the consequent increase in the cost of manufacture.

SUMMARY OF THE INVENTION

It is accordingly an object of this invention to provide a foot-operated control device constructed as simply as possible for a parking brake, wherein both application and release of the parking brake are conducted by foot.

Another object of the invention is to provide such control device wherein one of an intermediate lever and a transmission rod as employed in the previously indicated device known in the art is eliminated.

To attain the above objects, a control device according to the present invention comprises:

a sector fixed to a frame of the vehicle and having ratchet teeth formed along a circular arc;

a parking brake pedal connected to the sector pivotally about a center of the circular arc;

a pawl member pivotally connected to the brake pedal and having at one end thereof a pawl engageable with the ratchet teeth;

a lever pivotally connected to the brake pedal and engageable with the pawl member to pivot same in a first direction that causes the pawl to engage the ratchet teeth, the lever being pivotable in a second direction opposite to the first direction without association with the pawl member;

a first spring member associated with the lever and biasing the pawl member in the first direction;

a pedal pad pivotally connected to the brake pedal and foot-operated to pivot the brake pedal in one direction toward its operated position for applying a parking brake, the pedal pad being engageable with the lever and pivoting same in the second direction against a biasing force of the first spring member when the pedal pad is pivoted in another direction opposite to said one direction; and a second spring member biasing, at least after the lever has been pivoted in the second direction against the biasing force of the first spring member, the pawl member in the second direction so as to cause the pawl to disengage from the ratchet teeth, a biasing force of the second spring member being smaller than an engagement force existing between the pawl member and the ratchet teeth in engagement with the pawl member.

In the control device constructed as described above, a pivotal mnovement of the pedal pad is directly transmitted to the lever. In other words, no transmission rod is used for imparting the pivotal movement of the pedal pad to the lever to change the direction in which the pawl member is biased. This elimination of the transmission rod will simplify the overall structure of the control device.

In addition to the above advantage, the present control device offers a solution to all of the previously discussed problems experienced in the art. That is, the device according to the invention wherein the parking brake is released solely by foot: will not require the operator to lean forward in releasing the parking brake; will not generate undesired sounds of impacts; provides for an easy starting of the vehicle on a slope; and prevents otherwise possible inadvertent or unintentional release of the brake thanks to two-step pivoting and depressing operations to release the brake.

According to another form of the invention, the control device comprises:

a parking brake pedal;

a bracket fixed to a frame of the vehicle and supporting the brake pedal pivotally about a first axis, the bracket having ratchet teeth along an arc of a circle a center of which is located at the first axis;

a pawl member connected to the brake pedal pivotally about a second axis parallel to the first axis, the pawl member having at one end thereof a pawl engageable with the ratchet teeth;

a pedal pad connected to a free end portion of the brake pedal pivotally about a third axis parallel to the first axis;

an extension arm extending from one surface of the pedal pad on the side of the brake pedal;

a rod having a first end portion engaging the pawl member and a second end portion engaging the extension arm, the rod being movable relative to the pawl member and the extension arm in one direction from the first end portion toward the second end portion, and substantially immovable relative to the pawl member and the extension arm in the direction opposite to the one direction;

a first spring member biasing the rod in the opposite direction; and a second spring member biasing the pawl member in a first direction that causes the pawl to disengage from the ratchet teeth, a biasing force of the second spring member being smaller than an engagement force existing between the pawl member and the ratchet teeth in engagement with the pawl member.

In this modified embodiment of the control device of the invention, a linear movement of the rod incident to a pivotal movement of the pedal pad is directly utilized to set the pawl member ready to disengage from the ratchet teeth. Thus, no lever member is used to change, through pivotal movements of the pedal pad, the direction in which the pawl member is biased. This elimination of the lever member will simplify the overall structure of the control device. It will be understood to those skilled in the art that this form of the control device is also capable of solving the problems experienced in the art.

BRIEF DESCRIPTION OF THE DRAWINGS

The above and other objects, features and advantages of the present invention will become more apparent from reading the following description of the preferred embodiments taken in connection with the accompanying drawings in which.

DETAILED DESCRIPTION OF THE PREFERRED EMBODIMENTS

The present invention will be described in detail with reference to the accompanying drawings which illustrate different forms of a control device constructed according to the invention.

Figure 1:
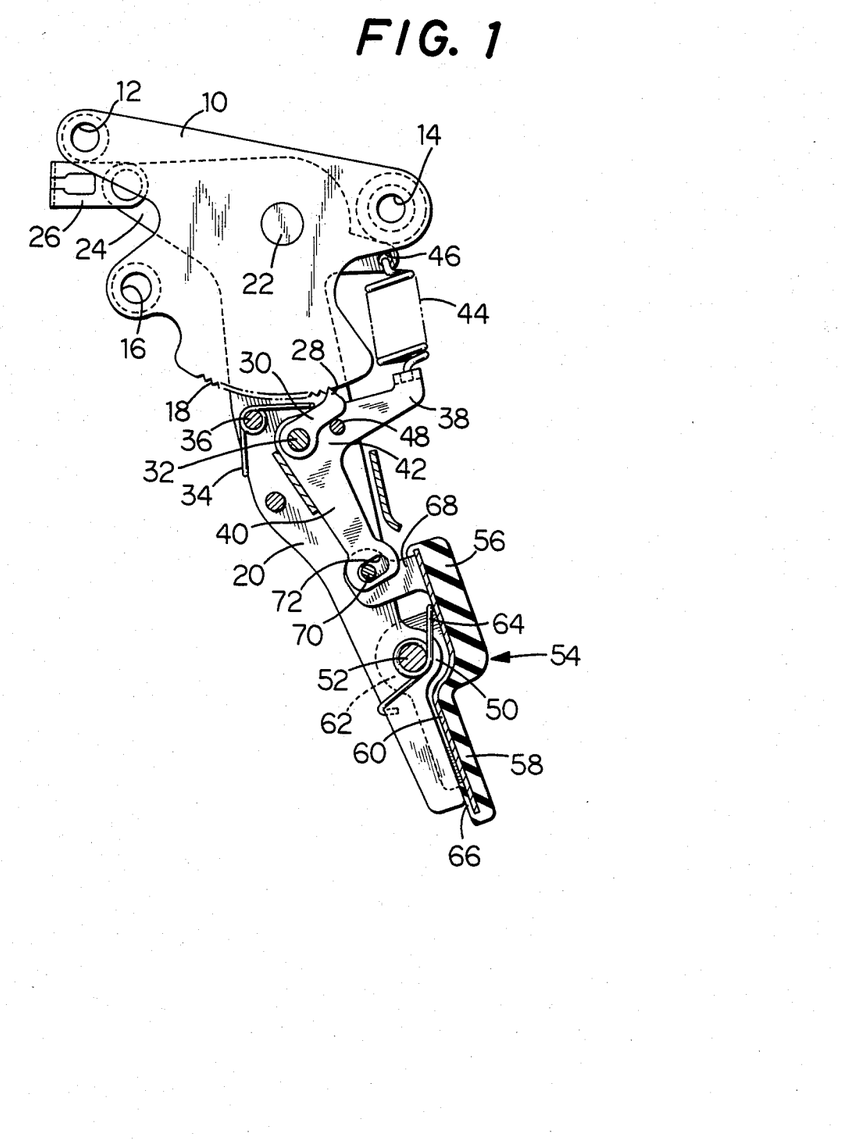
FIG. 1 is a side elevation, partly in cross section, of an embodiment of a foot-operated control device for a parking brake of the invention.
Figure 2:
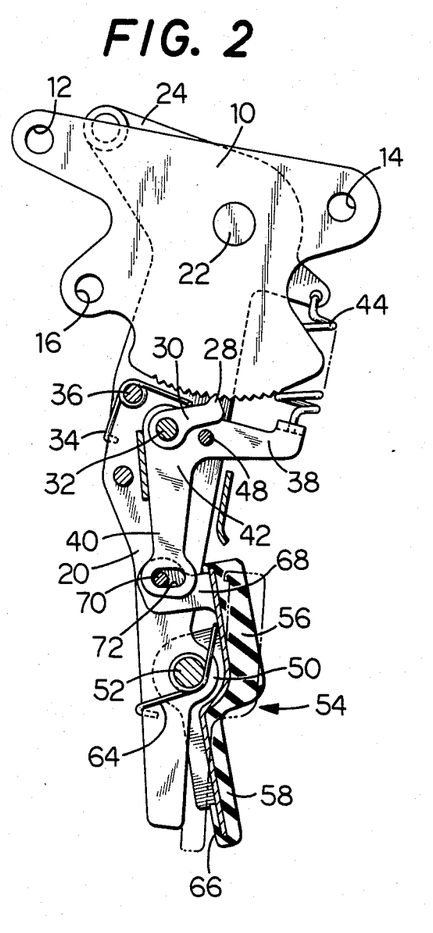
FIG. 2 is a side elevation, partly in cross section of the control device of FIG. 1 when placed in its operated position.

Referring first to FIGS. 1 and 2, there is illustrated a sector 10 having fixing holes 12, 14 and 16 and fixed to the frame of a vehicle on which a parking brake is mounted. The lower end portion of the sector 10 is arcuately shaped to provide a circular arc having a predetermined radius. Along this arcuate periphery are formed ratchet teeth 18 over a predetermined length. To the sector 10, there is pivotally connected a parking brake pedal 20 with a fulcrum axis shaft 22. The brake pedal 20 has, at its upper end portion, a projection 24 which extends leftward as viewed in FIG. 1 and provides a joint to which one end of a brake wire 26 is connected. When the brake pedal 20 is pivoted about the shaft 22 in one direction, i.e., clockwise as seen in FIGS. 1 and 2, the brake wire 26 is pulled and a parking brake is applied to the vehicle.

To a part of the brake pedal 20 located below the ratchet teeth 18, there is connected a pawl member 30 pivotally about a shaft 32. The pawl member 30 has a pawl 28 engageable with the ratchet teeth 18, and is biased, by a torsion spring 34 disposed adjacent the shaft 32, in a direction that causes the pawl 28 to disengage from the teeth 18, i.e., in the clockwise direction as viewed in FIGS. 1 and 2. The torsion spring 34 has a central coil portion wound about and supported by a pin 36 fixed to the brake pedal 20, and two arm portions one of which is kept in abutment on the pawl member 30 and the other of which is held in engagement with the front (on the left hand side in the figures) surface of the pedal 20.

The shaft 32 which pivotally supports the pawl member 30, also supports a bell-crank lever 42 such that it is pivotable about the shaft 32 independently of the pawl member 30. The bell-crank lever 42 includes a first arm 38 extending transversely of the pedal 20 beyond the rear surface, and a second arm 40 extending downwardly substantially along the length of the pedal 20. The free end of the first arm 38 is connected to the lower end of a coil spring 44 whose upper end engages a small hole 46 formed in the pedal 20, whereby the bell-crank lever 42 is biased counterclockwise. The lever 42 has a boss 48 which normally engages one side surface of the pawl member 30 thereby transmitting the biasing force of the coil spring 44 to the pawl member 30 so that the member 30 is urged counterclockwise, i.e., in the direction that causes the pawl 28 to engage the ratchet teeth 18. The biasing force of the coil spring 44 is selected to be greater than that of the torsion spring 34, whereby the pawl member 30 is kept forced against the sector 10 except when a depression is applied to the pedal 20 as described later.

The lower end of the brake pedal 20 has a protrusion 50 which extends rearwardly (toward the side of the vehicle operator) and supports a shaft 52 to which is connected a pedal pad 54 that is given an operating force by the vehicle operator when the control device is manipulated to control the parking brake. This pedal pad 54, as a whole, extends vertically or longitudinally of the brake pedal 20, and includes a stepped bi-planar member of resilient material and a backing plate 60. The stepped member consists of an upper section 56 and a lower section 58 whose plane is offset from the upper section across the length of the pedal pad in a direction toward the brake pedal 20. The pedal pad 54 further includes a pair of mounting legs 62 extending from the backing plate 60 across the length of the brake pedal. The mountiing legs 62 are pivotally connected to the shaft 52 such that there exists a predetermined amount of gap between the backing plate 60 and the opposite rear surface of the brake pedal 20, thereby allowing the pedal pad 54 to pivot relative to the brake pedal 20 within a limited range of angle. The pedal pad 54 is biased clockwise as seen in FIG. 1 by a torsion spring 64 both ends thereof engaging the pedal 20 and the pad 54 respectively. The pedal pad 54 has, at its lower end, a stop portion 66 which is normally kept in abutment on the rear surface of the pedal 20 at its extreme lower end. The pedal pad 54 further includes an extension arm 68 extending from the upper end portion thereof in a direction across the length of the brake pedal 20. The extension arm 68 which serves to transmit a pivotal movement of the pedal pad 20 to the above indicated bellcrank lever 42, has an engagement pin or boss 70 adjacent its end remote from the upper section 56. The boss 70 is inserted in an elongated hole 72 formed in the end of the second arm 40 of the lever 42, and thus adapted to come into engagement with the forward end of the elongated hole 72 when the pedal pad 54 is pivoted counterclockwise. While the pedal pad 54 is in its nonoperated or original position, the boss 70 is not in engagement with the forward end of the hole 72 as it is so designed that there is a gap therebetween. This gap provides for a free play of the pedal pad 54 upon initiation of the pivotal movement thereof, so that errors in the manufacture and assembling of the pawl member 30, lever 42 and pad 54 are absorbed by the free play of the pad. Put in the other way, the above gap is provided to prevent the boss 70 from engaging the second arm of the lever 42 and hindering the coil spring 44 from biasing the pawl member 30 through the lever 42.

When a parking brake is applied through the control device constructed as described above, the pedal pad 54 is depressed at its lower section 58 and the brake pedal 20 is consequently pivoted clockwise about the shaft 22. The pawl member 30 is moved as the brake pedal 20 is pivoted. More specifically, the pawl 28 which is forced against the arcuate end of the sector 10 by the coil spring 44 through the lever 42 and its boss 48, is brought into contact with the first tooth of the ratchet teeth 18 when the brake pedal 20 has been pivoted a fixed angle. A further movement of the pedal 20 will cause the pawl 28 to move on the ratchet teeth 18 while climbing over each tooth of the ratchet. Although the bell-crank lever 42 is pivoted clockwise an extremely small angle each time the pawl 28 climbs over the crest of the tooth 18, the resulting oscillation of the second arm 40 of the lever 42 will be absorbed by a gap existing in the elongated hole 72 and will not be transmitted to the pedal pad 54.

When the depression onto the pedal pad 54 is removed after a given angle of pivoting movement of the brake pedal 20, the pawl 28 of the pawl member 30 will engage an appropriate tooth of the ratchet teeth 18 as shown in FIG. 2, whereby the brake pedal 20 is locked in its operated position at which the brake wire 26 connected to the projection 24 of the pedal 20 is pulled a certain length and given a corresponding tightness.

When the applied parking brake is released, the upper section 56 is first depressed to pivot the pedal pad 54 counterclockwise. As a result, the boss 70 of the extension arm 68 is shifted within the elongated hole 72 until it abuts the surface defining the front end of the hole 72. After the abutment of the boss 70, the lever 42 is pivoted clockwise and the boss 48 at an upper part of the lever 42 is moved away from the side surface of the pawl member 30, whereby the biasing force of the coil spring 44 which has been applied to the pawl member 30 is removed so that only the biasing force of the torsion spring 34 is applied to the pawl member 30. While this biasing force of the torsion spring 34 acts on the pawl member 30 in a direction that causes it to pivot toward its non-operated or disengaged position, the torsion spring 34 will not cause the pawl member 30 to disengage from the ratchet teeth 18 because its biasing force is selected not to be greater than an engagement force existing between the pawl 28 and the ratchet teeth 18 due to a tensile force of the brake wire 26 or a biasing force of a return spring (not shown) provided to restore the brake pedal to its original position.

When the brake pedal 20 is further pivoted clockwise from the operated position shown in FIG. 2 by applying a further depression onto the upper section 56 of the pedal pad 54, the above indicated engagement force between the pawl 28 and the ratchet teeth 18 is lost and the pawl member 30 is pivoted clockwise with the biasing force of the torsion spring 34. Thus, the pawl member 30 disengages from the ratchet teeth 18. When the operator's foot is withdrawn, the brake pedal 20 is returned to its original position with the tensile force of the brake wire 26 or with the above indicated return spring connected to the pedal. In the last stage of the pedal return, the abutting engagement of the boss 70 with the lever 42 is released and the pawl member 30 is returned to its initial position at which the pawl 28 is again forced against the sector 10.

As described above, the control device of this invention permits both application and release of the parking brake by means of pivoting and depressing actions of the brake pedal 20 and the pedal pad 54, which can be accomplished by the vehicle operator, who is not required to change the posture in applying or releasing the brake. The brake pedal 20 is slowly returned to its original non-operated position by a gradual withdrawal of the operator's foot from the depressed position. This feature eliminates possible generation of undesired impact sounds when the brake is released otherwise. The gradual release of the parking brake combined with an easy manipulation of the control device for releasing the brake, will facilitate starting the vehicle parked on a slope. Further, the applied parking brake will not be released inadvertently or unintentionally because a release of the parking brake requires two steps of operation by the operator, i.e., both pivotal movement of the pedal pad 54 and subsequent depression of the brake pedal 20.

While the control device disclosed in JITSU-KAI-SHO 55-146363, published Japanese Utility Model application, is manipulated by foot to apply and release a parking brake as previously stated, such device is not satisfactory in various aspects. To manifest the features of the control device of the invention, the following desciption of the present invention refers to FIG. 3 which shows the known control device shown in the above published application. In the figure, a transmission rod 206 is interposed between a pivotally supported pedal pad 200 and an intermediate lever 204 for pivoting a pawl 202, and the motion linking or transmission mechanism is accordingly complicated. In the present control device, however, the pivoting motion of the pedal pad 54 is transmitted directly to the bell-crank lever 42 to pivot the pawl member 30 and therefore the number of parts is reduced, which results in reduced time and labor for the manufacture and assembling of the device and in decreased accumulative errors during the manufacturing and assembling processes. Again in the known device, a second spring 212 is disposed between the intermediate lever 204 and the pawl 202 which is forced against a sector 210 by a first spring 208, and the second spring 212 is arranged to be flexed, when the intermediate lever 204 is pivoted upon pivoting of the pedal pad 200, such that the biasing force of the second spring acts on the pawl 202 in the direction opposite to that in which the first spring 208 biases the pawl 202. Thus, the force with which the pawl 202 is biased at the end of pivotal motion of the pedal pad 200, is determined by a difference between resilient forces of the first and second springs 208 and 212 which acts in the opposite directions, and therefore affected by cumulative variations in spring constant, mounting position, etc. of both springs On the other hand, the force acting on the pawl member 30 of the present device at the end of the pivotal motion of the pedal pad 54 is determined exclusively by the resilient force of the torsion spring 34, and can therefore be easily set at an optimum level, whereby the pawl member 30 is less likely to be affected by variation in the resilient force of the spring 34 and can be stably operated.

Figures 3, 4, 5, 9:
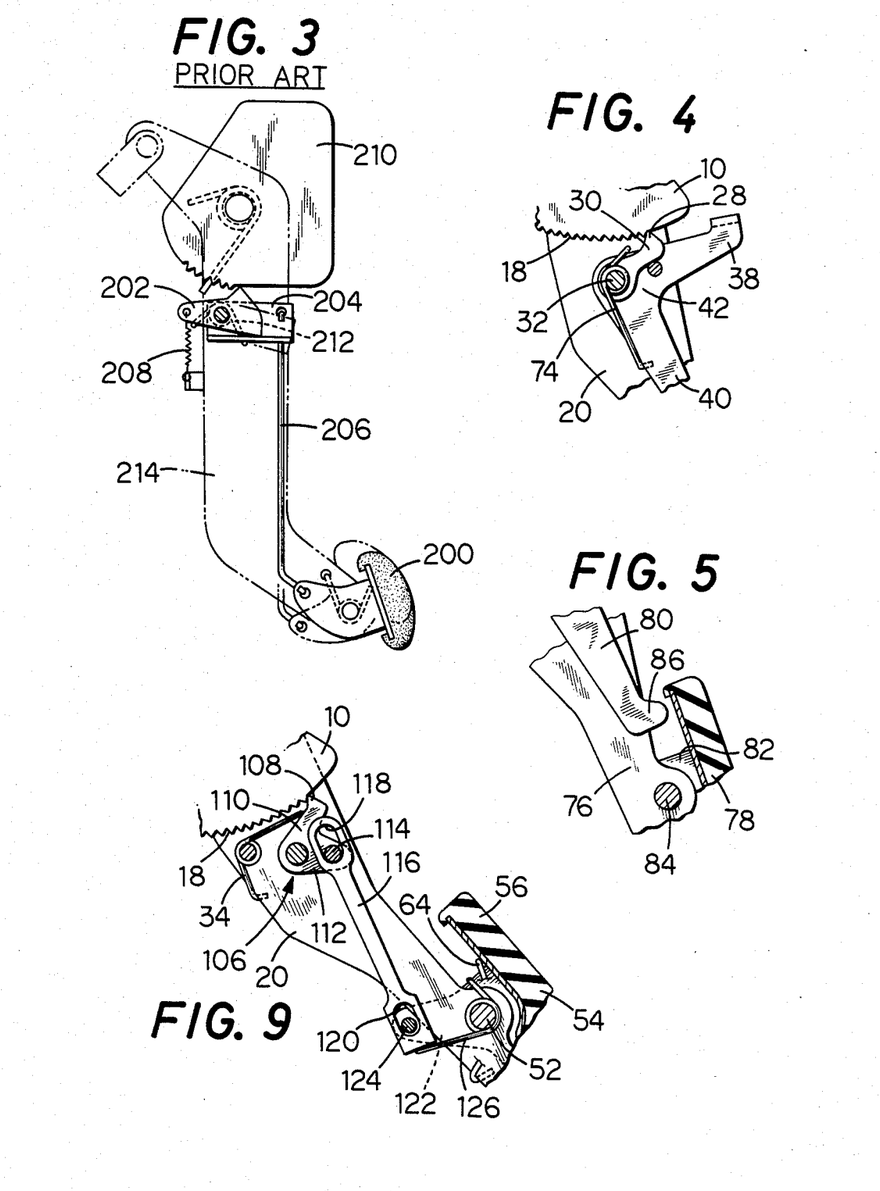
FIG. 3 is a side elevation of a foot-operated control device known in the art for a parking brake.
FIGS. 4 and 5 are side elevations, partly in cross section, of an essential part of modified embodiments of the control device of the invention.
FIG. 9 is a side elevation, partly in cross section, of an essential part of still another embodiment of the control device of the invention.

The known device shown in FIG. 3 is further disadvantageous in that its pedal pad 200 which has a comparatively short vertical length like an ordinary pedal pad, requires the operator to conduct a troublesome and difficult manipulation thereof by foot when the pad 200 is pivoted counterclockwise as seen in the figure, viz., the operator's foot must be lifted while in contact with the surface of the pedal pad as it is pivoted. When the brake pedal 214 is pivoted clockwise by depressing by foot the pivoted pedal pad 200 in an obliquely downward direction, the pedal pad 200 may possibly be pivoted clockwise to its original position during the pivoting movement of the pedal 214. Thus, extra care should be exercised when the brake pedal 214 is pivoted to release the parking brake. In the present device of the invention, to the contrary, the pedal pad 54 is a vertically extending comparatively long member including the lower section 58 which is depressed to apply the brake, and the upper section 56 which is depressed to release the brake. The depression by foot of the upper section 56 will first pivot the pad 54 and then pivot the pedal 20, allowing the brake to be easily released without the possibility of the pad 54 being pivoted back to its original position.

Referring next to FIG. 4, there is illustrated a modified embodiment of the present control device wherein a torsion spring 74 includes a central coil portion wound about the shaft 32 which supports the pawl member 30 and the bell-crank lever 42, and two arm portions one of which is held in engagement with the side surface of the second arm 40 of the lever 42, and the other of which is bent toward the brake pedal 20 to form a bent portion engaging the said surface of the first arm 38 of the lever 42.

With the above arrangement, a pivotal movement of the brake pedal 20 with the lower section 58 being depressed will cause the pedal 20 to be locked at its operated position while the pawl member 30 is kept in engagement with the ratchet teeth 18 with the biasing force of the coil spring 44 in the same manner as described in association with the previous embodiment. When the parking brake thus applied is released, the pedal pad 54 is pivoted by depressing the upper section 56, and the lever 42 is pivoted simultaneously with a result of removing the biasing force of the coil spring 44 which has been exerted on the pawl member 30. In the meantime, the torsion spring 74 is pivoted with the lever 42 in the same direction and the bent portion of said other arm is brought into engagement with the upper side of the pawl member 30, whereby the pawl member 30 is biased clockwise. When the brake pedal 20 is further depressed and the engagement force between the pawl 28 and the ratchet teeth 18 is lost, the pawl member 30 is separated from the ratchet teeth 18 with the biasing force of the torsion spring 74 whereby the brake pedal 20 is unlocked.

A further modified embodiment of the control device is illustrated in FIG. 5 wherein reference numerals 76, 78 and 80 designate a brake pedal, a pedal pad and a lever, respectively. The pedal pad 78 is pivotally connected to the brake pedal 76 through a shaft 84. In this embodiment, a pivotal movement of the pedal pad 78 in the counterclockwise direction will cause the lever 80 to pivot through abutment of the back surface of the pad on a projected end 86 of the lever 80. Thus, the lever 80 needs no elongated hole at its end, and the pedal pad 78 is not required to be provided with an arm and a boss engaging the end of the lever 80, thereby eliminating the need for inserting the boss in the elongated hole and thus facilitating the manufacture and assembling of the device. As in the previous embodiment, provisions are made for preventing possible oscillating movements of the lever 80 from being transmitted to the pedal pad 78 when the pawl 28 climbs over the ratchet teeth 18.

Further alternative forms of the control device of this invention are illustrated in FIGS. 6 through 9 wherein like reference characters used in the preceding figures designate like or corresponding parts throughout. Thus, the structural and operational descriptions of those parts are omitted.

Figures 6, 7:
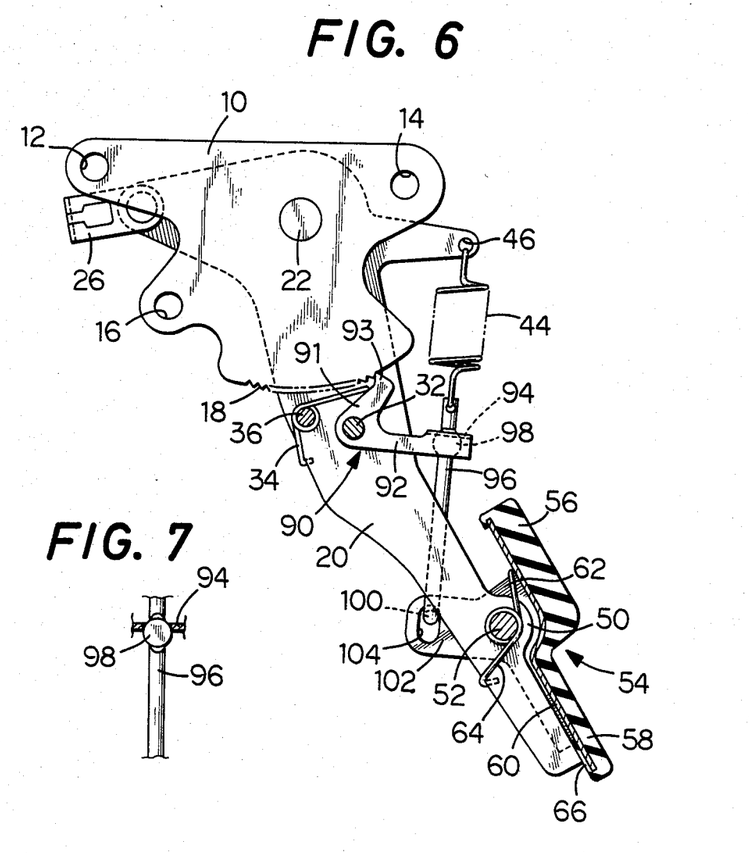
FIG. 6 is a side elevation, partly in cross section, of a further embodiment of the control device.
FIG. 7 is a cross sectional view of a rod engaging a pawl member of the control device of FIG. 6.
Figure 8:
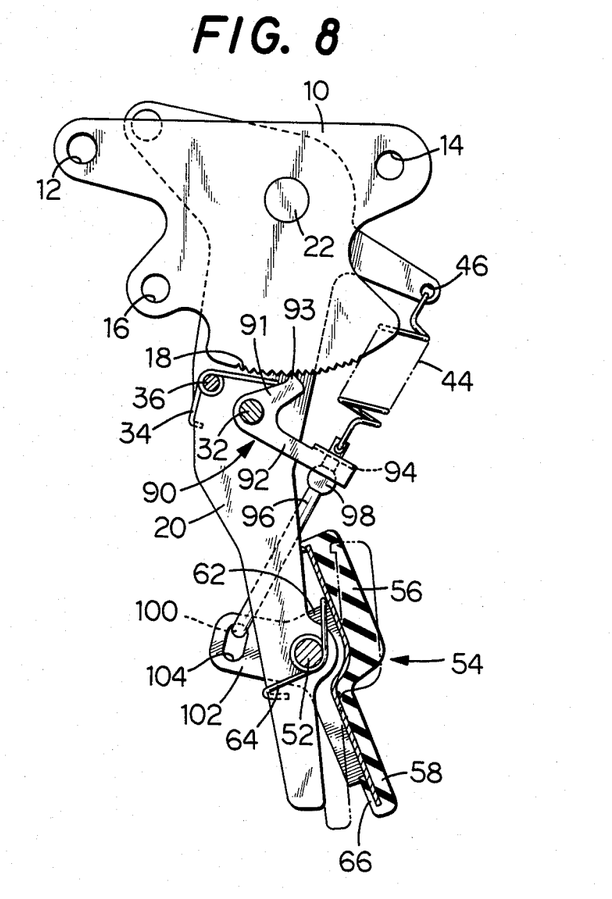
FIG. 8 is a side elevation, partly in cross section, of the control device of FIG. 6 when placed in its operated position.

Referring to FIGS. 6–8, there is presented a control device of the invention in its alternative form wherein a pawl member 90 is of bell-crank configuration having a first arm 91 and a second arm 92. The first arm 91 is provided, at its free end, with a pawl 93 which extends toward the bracket or sector 10 so that it engages the ratchet teeth 18. On the other hand, the second arm 92 is bent at its free end substantially at right angle to the brake pedal 20 or substantially in parallel to the shaft 32 to form a protrusion or bent portion 94 (shown in FIG. 7) having a hole through which a rod 96 is inserted so as to extend vertically in FIG. 1. The rod 96 is compressed at a part thereof to form a partially flattened engagement portion 98 which has a width greater than the diameter of the hole formed through the bent portion 94 and is consequently unable to move through the hole. Thus, the engagement portion 98 engages the bent portion 98 of the second arm 92 of the pawl member 90. The rod 96 has, at its lower end, a pin or bent portion 100 and is connected at its upper end to the lower end of the coil spring 44, whereby the biasing force of the spring 44 is applied to the pawl member 90 through the rod 96 and the pawl member 90 is normally kept in contact with the sector 10 due to the previously discussed relation of the biasing forces between the torsion and coil springs 34 and 44.

The pedal pad 54 used in this embodiment is provided with an arm 102 which is an extension from one of the pair of mounting legs 62. This extension arm 102 which is designed to transmit a pivotal movement of the pedal pad 54 to the pawl member 90, has at its end an elongated hole 104 which is formed in a direction substantially along the length of the rod 96. The bent portion 100 at the lower end of the rod 96 is inserted in the elongated hole 104 such that the bent portion 100 is located near the upper end of the hole 104, whereby the pivotal movement of the pedal pad 54 is transmitted to the rod 96. In this connection, it is noted that there is a gap between the bent portion 100 and the upper end of the hole 104. This gap which provides for a free play of the pedal pad 54, serves the same function as the gap between the boss 70 and the hole 72 in the previous embodiment.

When a parking brake is applied through the control device constructed as described above, the pedal pad 54 is depressed at its lower section 58 and the brake pedal 20 is consequently pivoted clockwise about the shaft 22. As the brake pedal 20 is pivoted, the pawl member 30 is moved. More particularly stated, the pawl 93 which is forced against the arcuate end of the sector 10 by the coil spring 44 through the rod 96, is brought into contact with the first tooth of the ratchet teeth 18 when the brake pedal 20 has been pivoted a certain angle. A further movement of the pedal 20 will cause the pawl 93 to move on the ratchet teeth 18 while climbing over each tooth of the ratchet. Although the rod 96 is slightly pushed downwardly each time the pawl 93 climbs over the tooth 18, the resulting up and down movements of the rod 96 will be absorbed by a gap existing in the elongated hole 104 and will not be transmitted to the pedal pad 54.

When the applied parking brake is released, the upper section 56 is first depressed to pivot the pedal pad 54 counterclockwise as shown in FIG. 8. At this time, the extension arm 102 is pivoted simultaneously and the upper end of the hole 104 comes into abutment on the bent portion 100 at the lower end of the rod 96, whereby the rod 96 is pulled downwardly against the biasing force of the coil spring 44. As a result, the flattened engagement portion 98 of the rod is moved off the second arm 92 of the pawl member 90 and the biasing force of the coil spring which has been applied to the pawl member 90 is removed, so that only the biasing force of the torsion spring 34 is applied to the pawl member 30. However, the torsion spring 34 will not cause the pawl member 90 to disengage from the ratchet teeth 18 for the same reason as previously stated.

When the pawl member 90 has been separated from the ratchet teeth 18 by further pivoting the brake pedal 20, the pedal can be returned to its original non-operated position by a gradual withdrawal of the operator's foot and the pawl member 90 restored to its initial position at which the pawl 93 is again kept forced against the sector 10.

The control device in the above described form provides the same advantages as discussed in connection with the preceding embodiments; no operator's need for changing the posture in releasing the brake, no generation of undesired sounds of impact, easy and slow release of the brake, and no possibility of inadvertent brake release. In contrast with the prior art control device shown in FIG. 3, the present form of the control device is advantageous in that the downward movement of the rod 96 is directly utilized to enable the pawl member 90 to disengage from the ratchet teeth 18 and that no intermediate member such as the intermediate lever 204 of the known device is necessary, whereby the construction, manufacture and assembling of the device are simplified and accumulative errors or deviations thereof are reduced.

As previously discussed, the present device is further advantageous in that the torsion spring 34 is the only biasing member urging the pawl member 90 away from the ratchet teeth 18 once the rod 96 has been lowered and that its biasing force is not varied as the pedal pad 54 is pivoted. In other words, the biasing force is constant irrespective of whether the pedal pad is in the operated position or in the non-operated position.

Referring to FIG. 9, there is described a still further embodiment of the control device of the invention wherein the brake pedal 20 is provided with a bell-crank shaped pawl member 106 including a first arm 110 having a pawl 112 similar to the pawls 28 and 93, and a second arm 112 which has a pin or boss 114 at its end. This boss 114 is inserted is an elongated hole 118 formed at the upper end of a rod 116, such that the boss is held in contact with the lower end of the elongated hole 118. The rod 116 has another elongated hole 120 which is formed at the lower end also along the length thereof. An extension arm 122 of the pedal pad 54 has a pin or boss 124 which is inserted in the elongated hole 120 so that the pivotal movement of the pedal pad 54 will immediately establishes the engagement of the boss 124 with the rod 116 and cause the rod to be pulled. This boss 124 as well as the boss 114 of the pawl member 106 are provided with a snap ring or other suitable means for preventing the rod 116 from being removed off the bosses 114 and 124.

Between the extension arm 122 of the pedal pad and the rod 116 is disposed a torsion spring 126 for biasing the rod 116 upwardly toward the sector 10. The biasing force of the torsion spring 126 is transmitted to the pawl member 106 via the rod 116 whereby the pawl 108 is kept forced against the sector 10.

When the parking brake is released, the upper section 56 is depressed to pivot the pedal pad 54 counterclockwise and the rod 116 is pulled downwardly. Thus, the biasing force of the torsion spring 126 is removed from the pawl member 106, whereby only the biasing force of the torsion spring 34 is applied to the pawl member 106. The pawl member 106 is separated from the ratchet teeth 18 and the brake pedal 20 is unlocked, in the same manner as described in the foregoing embodiments.

While the present invention has been described in its preferred embodiments, it is to be understood that the invention is not limited thereto but may be otherwise embodied within the scope of the following claims.

What is claimed is:

1. A foot-operated device for controlling a parking brake of a vehicle, comprising:

a sector fixed to a frame of the vehicle and having ratchet teeth formed along a circular arc;

a parking brake pedal connected to said sector pivotally about a center of said circular arc;

a pawl member pivotally connected to said brake pedal and having at one end thereof a pawl engageable with said ratchet teeth;

a lever pivotally connected to said brake pedal and having engaging means engageable with one side surface of said pawl member to pivot same in a first direction that causes said pawl to engage said ratchet teeth, said lever being pivotable in a second direction opposite to said first direction without engagement of said engaging means with said pawl member;

a first spring member associated with said lever and biasing the lever in said first direction, a biasing force of said first spring member being transmitted to said pawl member through said engaging means of said lever to bias the pawl member in said first direction;

a pedal pad pivotally connected to said brake pedal and foot-operated to pivot said brake pedal in one direction toward its operated position for applying a parking brake, said pedal pad being engageable with said lever and pivoting same in said second direction against the biasing force of said first spring member when said pedal pad is pivoted in another direction opposite to said one direction; and a second spring member directly biasing said pawl member in said second direction so as to cause said pawl to disengage from said ratchet teeth, a biasing force of said second spring member being smaller than an engagement force existing between said pawl member and said ratchet teeth in engagement with said pawl member.

2. A device as recited in claim 1, wherein said pawl member and said lever are both pivoted about a single axis.

3. A device as recited in claim 1, wherein said engaging means of said lever comprises a boss engageable with said one side surface of said pawl member.

4. A device as recited in claim 1, wherein said pedal pad includes an extension arm extending from one surface thereof on the side of said brake pedal, one of said lever and said extension arm having an elongated hole and the other having an engagement pin inserted in said elongated hole to transmit a pivotal movement of said pedal pad in said another direction to said lever and to prevent transmission of pivotal movements of said lever in said second direction to said pedal pad when said pawl member climbs over said ratchet teeth during a pivotal movement of said brake pedal to said operated position.

5. A device as recited in claim 1, wherein said second spring member is a torsion spring having one arm engaging said brake pedal and another arm engaging said pawl member.

6. A device as recited in claim 1, wherein said pedal pad comprises a stepped bi-planar member including a lower section and an upper section whose plane is offset from a plane of said lower section away from said brake pedal in a direction across the length of said brake pedal.

7. A foot-operated device for controlling a parking brake of a vehicle, comprising:

a parking brake pedal;

a bracket fixed to a frame of the vehicle and supporting said brake pedal pivotally about a first axis, said bracket having ratchet teeth along an arc of a circle a center of which is located at said first axis;

a pawl member connected to said brake pedal pivotally about a second axis parallel to said first axis, said pawl member having at one end thereof a pawl engageable with said ratchet teeth, and at the other end thereof a protrusion extending substantially in parallel to said second axis, said protrusion having a through-hole formed substantially at right angles to said common axis;

a pedal pad connected to a free end portion of said brake pedal pivotally about a third axis parallel to said first axis;

an extension arm extending from one surface of said pedal pad on the side of said brake pedal;

a rod having a first end portion extending through said through-hole in said protrusion of said pawl member so as to be axially movable, said first end portion of the rod including an engagement portion which is unable to pass through said through-hole, said engagement portion being engageable with said protrusion of the pawl member in said opposite direction, said rod further having a second end portion engaging said extension arm, said rod being movable relative to said pawl member and said extension arm in one direction from said first end portion toward said second end portion, and substantially immovable relative to said pawl member and said extension arm in the direction opposite to the one direction;

a first spring member biasing said rod in said opposite direction; and a second spring member biasing said pawl member in a direction that causes said pawl to disengage from said ratchet teeth, a biasing force of said second spring member being smaller than an engagement force existing between said pawl member and said ratchet teeth in engagement with said pawl member.

8. A device as recited in claim 7, wherein said first spring member is a coil spring connected between said brake pedal, and the end of said first end portion of the rod extending out of said through-hole in a direction away from said engagement portion.

9. A device as recited in claim 7 wherein said pedal pad comprises a stepped bi-planar member including a lower section and an upper section whose plane is offset from a plane of said lower section away from said brake pedal in a direction across the length of said brake pedal.

10. A foot-operated device for controlling a parking brake of a vehicle, comprising:

a sector fixed to a frame of the vehicle and having ratchet teeth formed along a circular arc;

a parking brake pedal connected to said sector pivotally about a center of said circular arc;

a pawl member pivotally connected to said brake pedal and having at one end thereof a pawl engageable with said ratchet teeth;

a lever pivotally connected to said brake pedal and engageable with said pawl member to pivot same in a first direction that causes said pawl to engage said ratchet teeth, said lever being pivotable in a second direction opposite to said first direction without association with said pawl member;

a first spring member associated with said lever and biasing said pawl member in said first direction;

a pedal pad pivotally connected to said brake pedal and foot-operated to pivot said brake pedal in one direction toward its operated position for applying a parking brake, said pedal pad being engageable with said lever and pivoting same in said second direction against a biasing force of said first spring member when said pedal pad is pivoted in another direction opposite to said one direction; and a torsion spring as a second spring member having two arms normally held in engagement with two side surfaces of said lever respectively, one of said two arms engaging said pawl member and biasing same in said second direction so as to cause said pawl to disengage from said ratchet teeth after said lever has been pivoted more than a predetermined angle in said second direction against the biasing force of said first spring member, a biasing force of said torsion spring being smaller than an engagement force existing between said pawl member and said ratchet teeth in engagement with said pawl member.

11. A foot-operated device for controlling a parking brake of a vehicle, comprising:

a parking brake pedal;

a bracket fixed to a frame of the vehicle and supporting said brake pedal pivotally about a first axis, said bracket having ratchet teeth along an arc of a circle a center of which is located at said first axis;

a pawl member connected to said brake pedal pivotally about a second axis parallel to said first axis, said pawl member having at one end thereof a pawl engageable with said ratchet teeth, and further having a pin extending parallel to said second axis;

a pedal pad connected to a free end portion of said brake pedal pivotally about a third axis parallel to said first axis;

an extension arm extending from one surface of said pedal pad on the side of said brake pedal;

a rod including a first end portion having an axially formed elongated hole, and further including a second end portion engaging said extension arm, said pin of the pawl member engaging said elongated hole in said first end portion, said rod being movable relative to said pawl member and said extension arm in one direction from said first end portion toward said second end portion, and substantially immovable relative to said pawl member and said extension arm in another direction opposite to said one direction;

a first spring member biasing said rod in said another direction; and a second spring member biasing said pawl member in a first direction that causes said pawl to disengage from said ratchet teeth, a biasing force of said second spring member being smaller than an engagement force existing between said pawl member and said ratchet teeth in engagement with said pawl member.

12. A device as recited in claim 11, wherein one of said second end portion of the rod and said extension arm has an elongated hole, and the other has a pin engaging said elongated hole.

13. A device as recited in claim 11, wherein said first spring member is a torsion spring wound about said third axis, said torsion spring having one arm engaging said pedal pad and another arm engaging the end surface of said second end portion of the rod.

14. A foot-operated device for controlling a parking brake of a vehicle, comprising:

a sector fixed to a frame of the vehicle and having ratchet teeth formed along a circular arc;

a parking brake pedal connected to said sector pivotally about a center of said circular arc;

a pawl member pivotally connected to said brake pedal and having at one end thereof a pawl engageable with said ratchet teeth;

a lever pivotally connected to said brake pedal and engageable with said pawl member to pivot same in a first direction that causes said pawl to engage said ratchet teeth, said lever being pivotable in a second direction opposite to said first direction without association with said pawl member;

a spring member associated with said lever and biasing said pawl member in said first direction; and a pedal pad pivotally connected to said brake pedal and foot-operated to pivot said brake pedal in one direction toward its operated position for applying a parking brake, said pedal pad being engageable with said lever and pivoting same in said second direction against a biasing force of said spring member when said pedal pad is pivoted in another direction opposite to said one direction, a free end of said lever being normally held in spaced-apart relation with one surface of said pedal pad on the side of said brake pedal to prevent transmission of pivotal movements of said lever in said second direction to said pedal pad when said pawl climbs over said ratchet teeth during a pivotal movement of said brake pedal to said operated position, said one surface of the brake pedal abutting onto said free end upon pivotal movement of said pedal pad.

15. A foot-operated device for controlling a parking brake of a vehicle, comprising:

a sector fixed to a frame of the vehicle and having ratchet teeth formed along a circular arc;

a parking brake pedal connected to said sector pivotally about a center of said circular arc;

a pawl member pivotally connected to said brake pedal and having at one end thereof a pawl engageable with said ratchet teeth;

a lever pivotally connected to said brake pedal and engageable with said pawl member to pivot same in a first direction that causes said pawl to engage said ratchet teeth, said lever being pivotable in a second direction opposite to said first direction without association with said pawl member;

a first spring member associated with said lever and biasing said pawl in said first direction;

a pedal pad pivotally connected to said brake pedal and foot-operated to pivot said brake pedal in one direction towards its operated position for applying a parking brake, said pedal pad being engageable with said lever and pivoting same in said second direction against a biasing force of said first spring member when said pedal pad is pivoted in another direction opposite to said one direction; and a second spring member biasing, at least after said lever has been pivoted in said second direction against the biasing force of said first spring member, said pawl member in said second direction so as to cause said pawl to disengage from said ratchet teeth, a biasing force of said second spring member being smaller than an engagement force existing between said pawl member and said ratchet teeth in engagement with said pawl member, said lever having a free end which is normally held in spaced-apart relation with one surface of said pedal pad on the side of said brake pedal to prevent transmission of pivotal movements of said lever in said second direction to said pedal pad when said pawl member climbs over said ratchet teeth during a pivotal movement of said brake pedal to said operated position, said one surface of the brake pedal abutting onto said free end of the lever upon pivotal movement of said pedal pad.

* * * * *

UNITED STATES PATENT AND TRADEMARK OFFICE
CERTIFICATE OF CORRECTION

PATENT NO. : 4,519,270

DATED : May 28, 1985

INVENTOR(S) : H. Kawaguchi and S. Nishina

It is certified that error appears in the above-identified patent and that said Letters Patent is hereby corrected as shown below:

Column 7, line 8, change "acts" to --act--.

Column 7, line 11, change "springs" to --springs.--.

Column 7, line 51, change "said" to --side--

Column 10, line 18, change "establishes" to --establish--.

Column 11, line 57, change "common" to --second--.

Signed and Sealed this

Fifth Day of November 1985

[SEAL]

Attest:

Attesting Officer

DONALD J. QUIGG

Commissioner of Patents and Trademarks